United States Patent
Ahmed et al.

(10) Patent No.: US 9,215,477 B2
(45) Date of Patent: Dec. 15, 2015

(54) PUBLICATION OF TELEVISION CONTENT TO TELEVISION DISTRIBUTION SITES

(75) Inventors: Amir Ahmed, Temple Terrace, FL (US);
Haosheng Guo, Nashua, NH (US);
Zhiying Jin, Lexington, MA (US);
Wenjie Liu, Waltham, MA (US);
Juhong Liu, Sudbury, MA (US);
Surender Mallesh, Burlington, MA (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 729 days.

(21) Appl. No.: 12/485,177

(22) Filed: Jun. 16, 2009

(65) Prior Publication Data
US 2010/0319048 A1   Dec. 16, 2010

(51) Int. Cl.
*H04N 7/16* (2011.01)
*H04N 21/231* (2011.01)
*H04N 21/222* (2011.01)
*H04N 21/262* (2011.01)
*G06F 15/16* (2006.01)
*G06F 9/44* (2006.01)

(52) U.S. Cl.
CPC ..... *H04N 21/23106* (2013.01); *H04N 21/2221* (2013.01); *H04N 21/23113* (2013.01); *H04N 21/26291* (2013.01)

(58) Field of Classification Search
CPC ............. H04N 21/23105; H04N 21/2221; H04N 21/23113; H04N 21/26291
USPC ............... 725/143–146; 709/232; 717/172
See application file for complete search history.

(56) References Cited

U.S. PATENT DOCUMENTS

| | | | |
|---|---|---|---|
| 6,748,447 B1* | 6/2004 | Basani et al. | 709/244 |
| 7,024,466 B2* | 4/2006 | Outten et al. | 709/219 |
| 7,047,287 B2* | 5/2006 | Sim et al. | 709/221 |
| 7,162,433 B1 | 1/2007 | Foroutan | |
| 7,324,555 B1* | 1/2008 | Chen et al. | 370/468 |
| 7,543,067 B2* | 6/2009 | Matsubayashi et al. | 709/228 |
| 2002/0069420 A1 | 6/2002 | Russell et al. | |
| 2005/0060759 A1* | 3/2005 | Rowe et al. | 725/143 |
| 2005/0262246 A1 | 11/2005 | Menon et al. | |
| 2007/0124769 A1 | 5/2007 | Casey et al. | |
| 2007/0263635 A1 | 11/2007 | Garg | |
| 2007/0277205 A1 | 11/2007 | Grannan | |
| 2009/0125962 A1* | 5/2009 | Colosky et al. | 725/116 |
| 2009/0193477 A1* | 7/2009 | Takezawa | 725/92 |

OTHER PUBLICATIONS

International Search Report of the International Searching Authority for International Application No. PCT/US2010/036981, published Dec. 23, 2010.*

(Continued)

*Primary Examiner* — Hoang-Vu A Nguyen Ba

(57) ABSTRACT

A device receives updated television content, and generates a file that provides an indication to copy the updated television content to multiple television distribution sites, where each television distribution site includes multiple television distribution devices. The device identifies one of the multiple television distribution devices, associated with each of the multiple television distribution sites, to receive the file, packages the updated television content with the file, for the identified one of the multiple television distribution devices, and provides the updated television content and the file to the identified one of the multiple television distribution devices.

20 Claims, 17 Drawing Sheets

(56) References Cited

OTHER PUBLICATIONS

Written Opinion of the International Searching Authority for International Application No. PCT/US2010/036981, published Dec. 16, 2011.*

Lie, et al., "Threshold-based dynamic replication in large-scale video-on-demand systems", Reasearch Issues in Data Engineering, 1998. 'Continuous-Media Databases & Applications', Proceedings., Los Alamitos, CA, IEEE Comput. Soc, US, pp. 52-59, Feb. 23, 1998.

Venkatasubramanian, et al., "Load Management in Distributed Video Servers", Proceedings of the 17th International Conference in Baltimore, MD, Los Alamitos, CA, IEEE Comput. Soc, US, pp. 528-535, May 27, 1997.

* cited by examiner

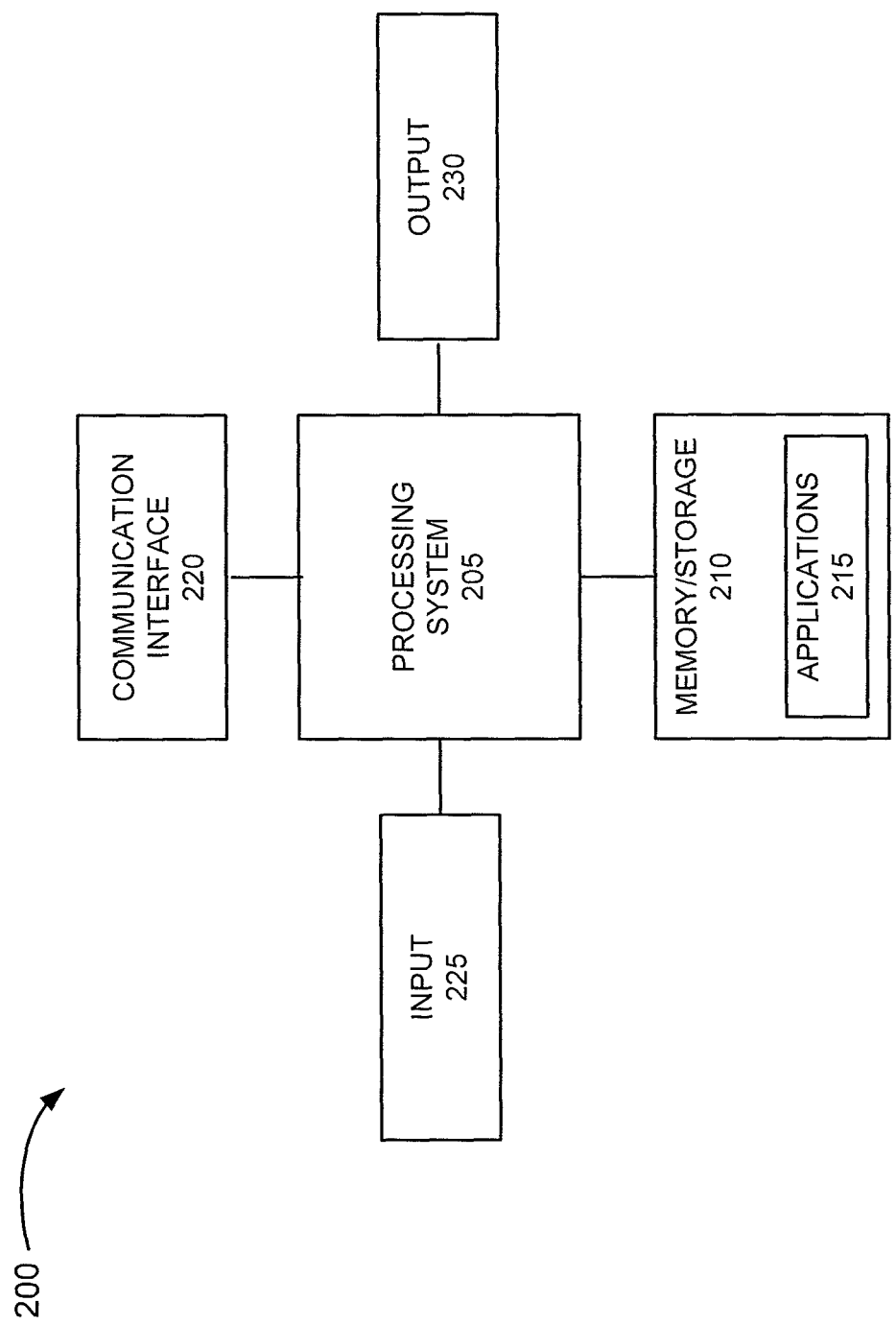

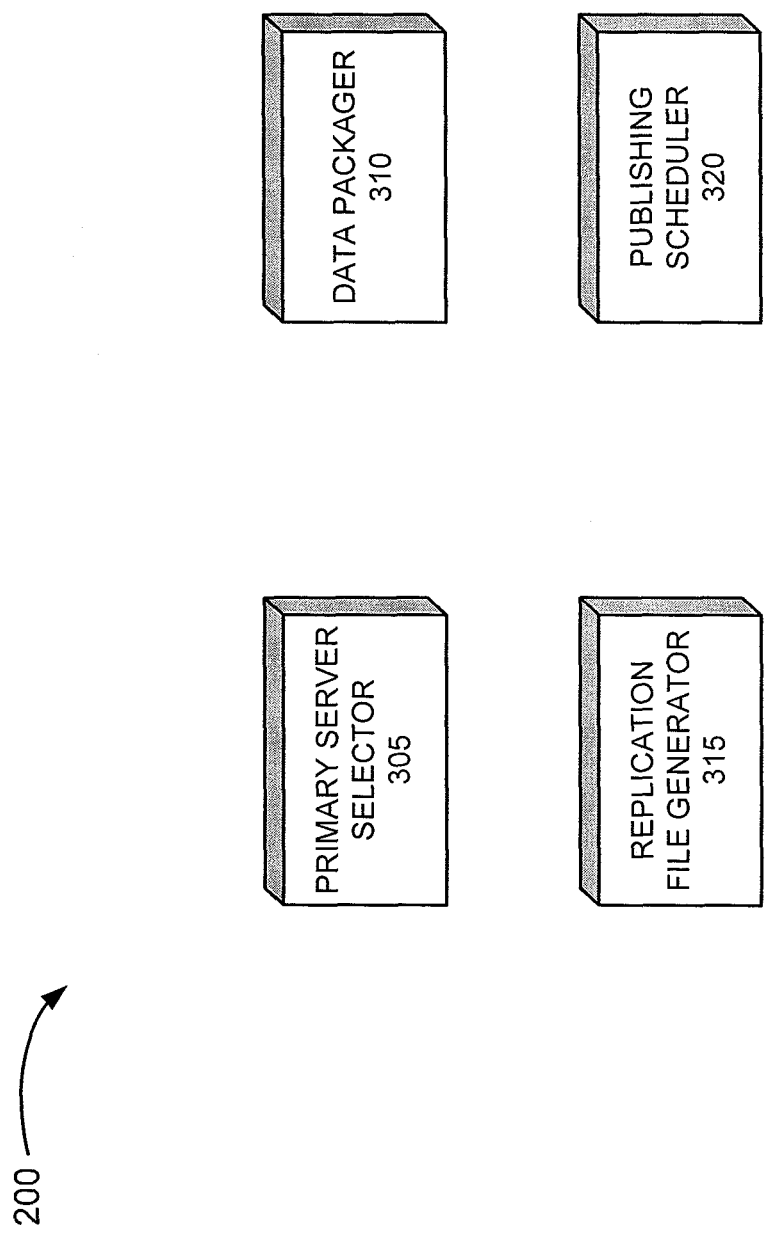

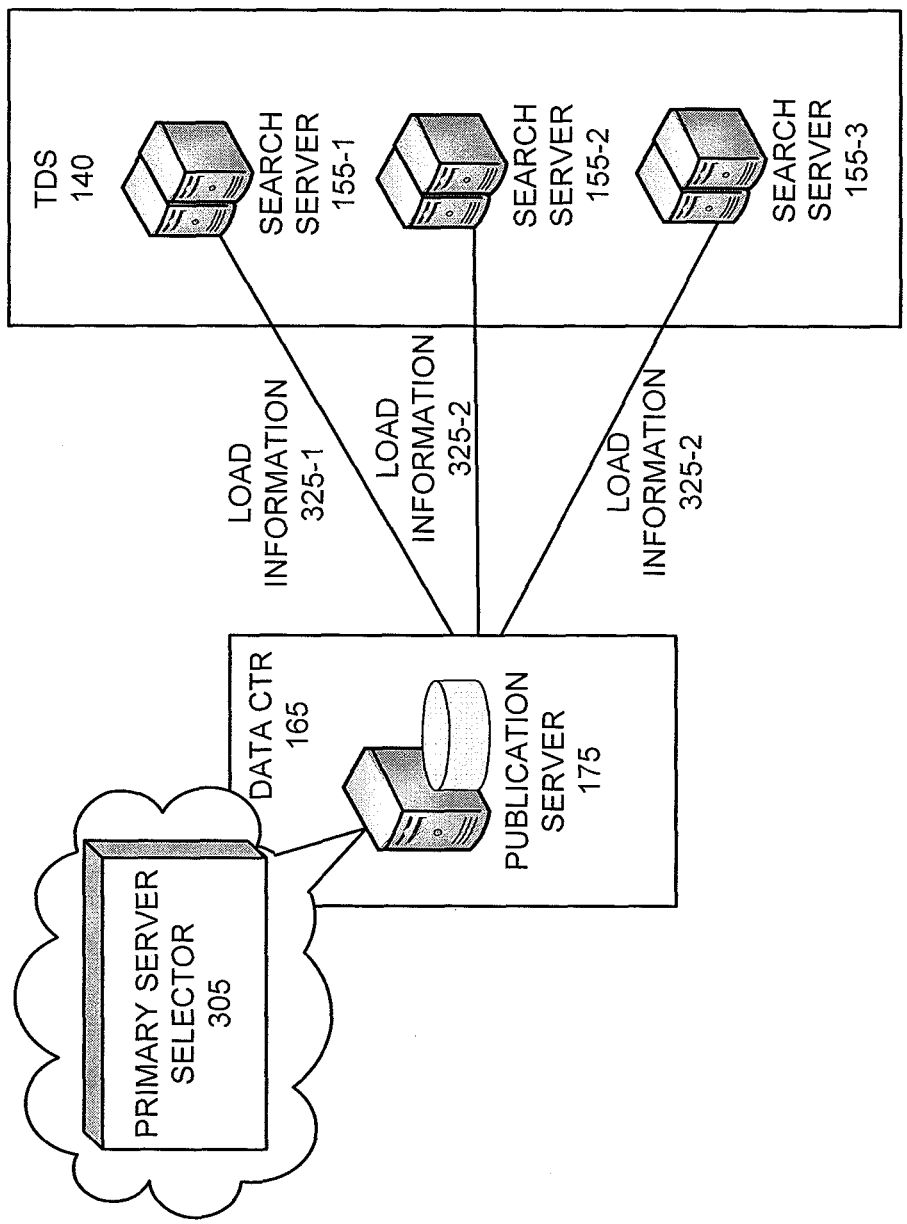

PUBLICATION OF TELEVISION CONTENT TO TELEVISION DISTRIBUTION SITES

BACKGROUND

In today's television content delivery systems, customers are provided an expansive array of television content, such as, television shows, games, movies, documentaries, sporting events, on-demand television content, and/or other types television content (e.g., television guides, etc.). In such television content delivery systems, data publication becomes critical so that up-to-date television content is available for customers to search and view. However, network operators and service providers are confronted with various challenges based on the expansive geographic nature of television content delivery systems, large data transfers, and time constraints.

BRIEF DESCRIPTION OF THE DRAWINGS

FIG. 2 is a diagram illustrating exemplary components of a device that may correspond to one or more of the devices depicted in the exemplary environment of FIG. 1;

FIGS. 3A-3E are diagrams illustrating exemplary functional components of a publishing server depicted in FIGS. 1 and 2;

DETAILED DESCRIPTION OF PREFERRED EMBODIMENTS

Figure 1:
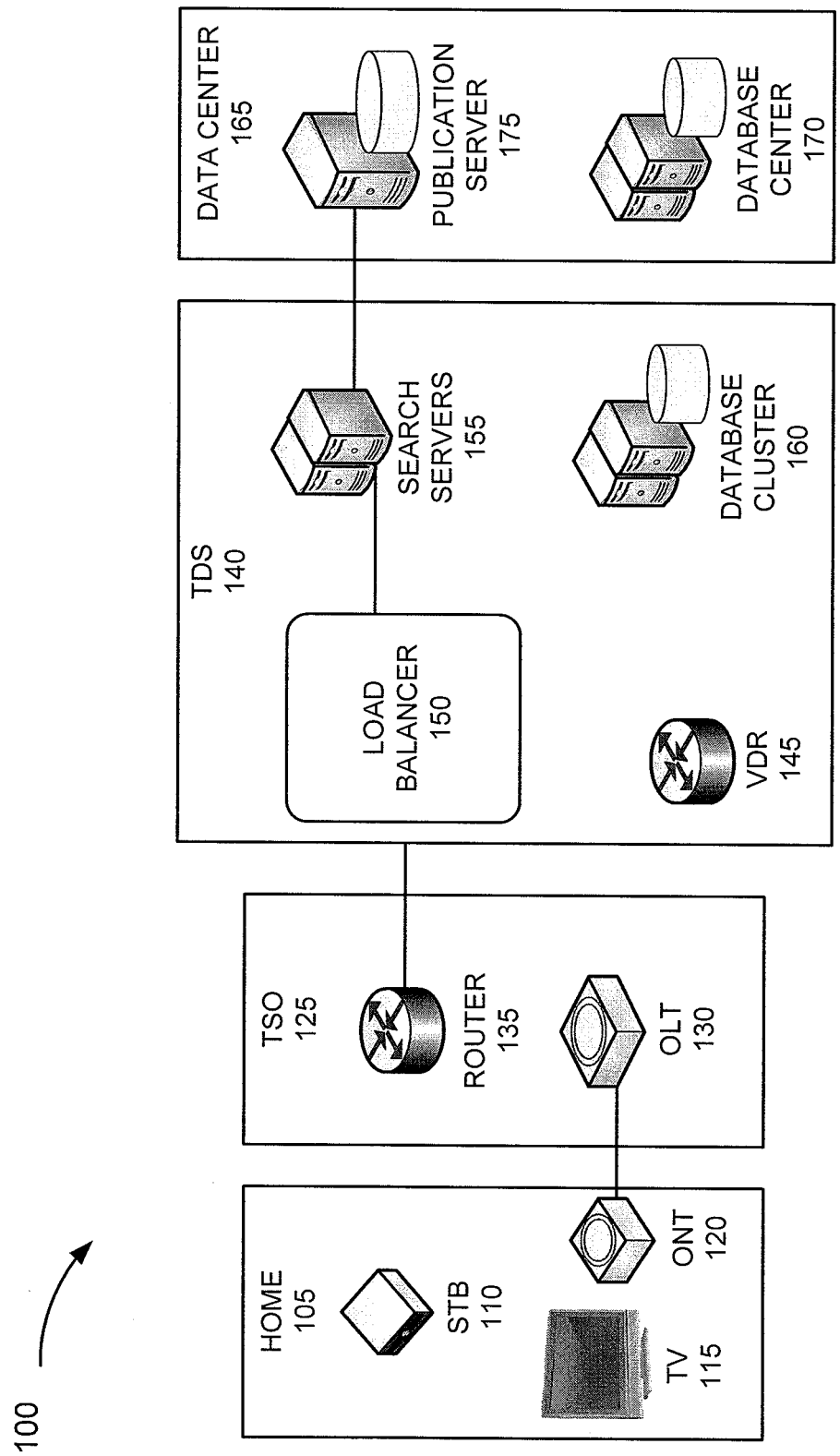
FIG. 1 is a diagram illustrating an exemplary environment in which devices, methods, and systems described herein may be implemented to provide for receiving, processing, and publishing of television content.

The following detailed description refers to the accompanying drawings. The same reference numbers in different drawings may identify the same or similar elements. Also, the following detailed description does not limit the invention.

As will be described herein, a television content delivery system may provide for the receiving, processing, and/or publishing of television content to television distribution sites which may be geographically distributed. Typically, updated television content is received, processed, and published daily. For example, the updated television content may be received by a data center. The updated television content may include, for example, television guides, games, on-demand television content, television programming, movies, etc. Upon receipt of the updated television content, the television content delivery system may process the updated television content before distribution to the geographically distributed television distribution sites. For example, the television content delivery system may determine the television content that may be common to all of the television distribution sites and the television content that may not be common to all of the television distribution sites. Television content that may be common to all of the television distribution sites may include, for example, television guides, games, television content on-demand, and other types of television programming. Television content that may not be common to all of the television distribution sites may include, for example, local television content, television schedules, and other types of television programming. The television content delivery system may package the television content designated for each of the television distribution sites based on this scheme. In this way, a common portion of each package to each of the television distribution sites may be processed only once, and the uncommon television content among the television distribution sites may be added to each of the common portions of the television content.

Additionally, as described herein, the television content delivery system may push each package to each of the television distribution sites based on the size of the television content to be pushed and/or a time zone associated with the television distribution site. Typically, however, a television distribution site may include multiple television distribution site devices (e.g., servers). In one embodiment, the television content delivery system may select a primary television distribution site device to receive the packaged television content. The television content delivery system may select one of the multiple television distribution site devices as a primary television distribution site device to receive the package based on respective load information associated with each of the television distribution site devices. For example, the television content delivery system may query each of the television distribution site devices to determine which of the multiple television distribution site devices has the least load. The television distribution site device having the least load will be selected as the primary television distribution site device. The television content delivery system may then publish or push the packaged television content to the primary television distribution site device. Additionally, the television content delivery system may include a replication file that instructs and/or indicates to the primary television distribution site device to replicate the pushed packaged television content to another one of the television distribution site devices. This replication process may concatenate until all of the television distribution site devices have received the packaged television content.

The process of receiving, processing, and publishing the updated television content may include monitoring and verification processes. Additionally, the television distribution site devices may provide automatic retry mechanisms to minimize human intervention, as well as automatic notification procedures (e.g., to network operator personnel) to provide intervention. Additionally, the process of receiving, processing, and replicating the updated television content may include analogous processes (i.e., monitoring, verifying, retrying, etc.).

FIG. 1 is a diagram illustrating an environment in which devices, methods, and/or systems described herein may be implemented to provide for the receiving, the processing and the publishing of television content. As illustrated in FIG. 1, exemplary environment 100 may include a home 105 that includes a set top box 110, a television (TV) 115, and an optical network termination unit (ONT) 120; a television serving office (TSO) 125 that includes an optical line termination unit (OLT) 130 and a router 135; a television distribution site (TDS) 140 that includes a video disk recorder 145, a load balancer 150, search servers 155, and a database (DB)

cluster 160; and a data center 165 that includes a database center 170 and a publication server 175.

It will be appreciated that the number of devices and/or configuration in environment 100 is exemplary and provided for simplicity. In practice, environment 100 may include more, fewer, and/or different devices, and/or differently arranged devices than those illustrated in FIG. 1. Also, some functions described as being performed by a particular device may be performed by a different device, or combination thereof, in other implementations. Environment 100 may include wired and/or wireless connections. It will be appreciated that the connections illustrated in FIG. 1 are exemplary and provided for simplicity. Additionally, although environment 100 utilizes, for example, ONT 120 and OLT 130, in other implementations, connections other than optical connections may be utilized. In this regard, the embodiments described herein are not limited to any particular type of link, protocol, device, etc.

Home 105 may correspond to a customer site. As illustrated, home 105 may include exemplary customer premise equipment, such as, for example, set top box 110, TV 115, and ONT 120. Set top box 110 may include a device to provide television content to TV 115. TV 115 may include a device to provide television content to a customer. ONT 120 may include a device that provides an interface between an optical distribution network and the customer site. For example, ONT 120 may provide an interface between home 105 and TSO 125.

TSO 125 may correspond to an intermediary television distribution site between home 105 and TDS 140. As illustrated, TSO 125 may include exemplary television distribution devices, such as, for example, OLT 130 and router 135. OLT 130 may include a device that serves as the point of origination for fiber-to-the-premises (FTTP) transmissions coming into and out of TDS 140. Router 135 may include a device that routes television content.

TDS 140 may correspond to a television distribution site. As illustrated, TDS 140 may include exemplary television distribution devices, such as, for example, VDR 145, load balancer 150, search servers 155 and DB cluster 160. Load balancer 150 may include a device that manages the load (e.g., provisioning and delivery of television content to customers) among search servers 155. Load balancer 150 may distribute the load among search servers 155 in an equally distributed fashion. Search servers 155 may include devices that provide for the delivery of television content to customers. Search servers 155 will be described in greater detail below. DB cluster 160 may include a device that stores various types of data, such as, for example, an interactive programming guide (IPG), set top box configuration data, and/or customer profile data.

Data center 165 may correspond to a television distribution site that receives and manages television content. As illustrated, data center 165 may include exemplary television distribution devices, such as, for example, database center 170 and publication server 175. Database center 170 may include a device that stores television content. For example, a television service provider may receive and/or generate updated television content and store the updated television content in database center 170. Publication server 175 may include a device that publishes or pushes the updated television content stored in database center 170 to TDS 140. Publication server 175 will be described in greater detail below.

According to exemplary embodiments, database center 170 may receive updated television content to publish. Publication server 175 may retrieve or receive the updated television content from database center 170. Publication server 175 may push the updated television content to TDS 140. For example, as previously described, publication server 175 may determine the loads of each of search servers 155. Publication server 175 may select a primary search server 155 that has the lowest load. Publication server 175 may package the updated television content, as previously described, and push the updated television content to primary search server 155. Primary search server 155 may copy the updated television content onto one of the other search servers 155 based on the replication file included with the updated television content. Primary search server 155 may load the updated television content, and once completed, relay this information to the other search server 155. The other search server 155 may copy the updated television content onto another one of the search servers 155 based on the replication file. The other search server 155 may load the updated television content, and once completed, relay this information to yet another search server 155, etc., until all of search servers 155 have received the updated television content.

Data center 165 may push the updated television content to multiple TDSs 140. Additionally, data center 165 may schedule and push the updated television content to TDSs 140 based on the size of the television content, which may correspond to the number of customers serviced by TDS 140, and/or the time zone in which TDS 140 may reside.

As a result of the foregoing, a television content delivery system may publish updated television content to multiple television distribution sites, which may be located in different geographical location, and may each have multiple television distribution servers, in a manner that accommodates large data transfers within a limited period of time. Since embodiments and implementations have been broadly described, variations to the above embodiments and implementations will be discussed further below.

FIG. 2 is a diagram illustrating exemplary components of device 200 that may correspond to one or more of the devices in environment 100. For example, device 200 may correspond to each of search servers 155, publication server 175, as well other devices in environment 100. As illustrated, device 200 may include a processing system 205, memory/storage 210 including applications 215, a communication interface 220, an input 225, and an output 230. In other embodiments, device 200 may include fewer, additional, and/or different components, or a different arrangement of components than those illustrated in FIG. 2 and described herein.

Processing system 205 may include one or more processors, microprocessors, data processors, co-processors, network processors, application specific integrated circuits (ASICs), controllers, programmable logic devices, chipsets, field programmable gate arrays (FPGAs), or some other component that may interpret and/or execute instructions and/or data. Processing system 205 may control the overall operation, or a portion thereof, of device 200, based on, for example, an operating system and/or various applications (e.g., applications 215).

Memory/storage 210 may include memory and/or secondary storage. For example, memory/storage 210 may include a random access memory (RAM), a dynamic random access memory (DRAM), a read only memory (ROM), a programmable read only memory (PROM), a flash memory, and/or some other type of memory. Memory/storage 210 may include a hard disk (e.g., a magnetic disk, an optical disk, a magneto-optic disk, a solid state disk, etc.) or some other type of computer-readable medium, along with a corresponding drive. The term "computer-readable medium" is intended to be broadly interpreted to include a memory, a secondary storage, a compact disc (CD), a digital versatile disc (DVD), or the like. The computer-readable medium may be implemented in a single device, in multiple devices, in a centralized manner, or in a distributed manner. A computer-readable medium may be defined as a physical or logical memory device. A logical memory device may include memory space within a single physical memory device or spread across multiple physical memory devices.

Memory/storage 210 may store data, application(s), and/or instructions related to the operation of device 200. For example, memory/storage 210 may include applications 215 that provide for the processing, publishing, and/or delivery of television content.

Communication interface 220 may permit device 200 to communicate with other devices, networks, and/or systems. For example, communication interface 220 may include a cable interface, a fiber optic interface, a radio interface, or some other type of wireless or wired interface.

Input 225 may permit a user and/or another component or device to input information in device 200. For example, input 225 may include a keyboard, a keypad, a display, a touchpad, a mouse, a button, a switch, a microphone, an input port, a drive, voice recognition logic, and/or some other type of visual, auditory, and/or tactile input component. Output 230 may permit device 200 to output information to a user and/or another component or device. For example, output 230 may include a display, a speaker, light emitting diodes (LEDs), an output port, and/or some other type of visual, auditory, and/or tactile output component.

As described herein, device 200 may perform certain operations in response to processing system 205 executing software instructions contained in a computer-readable medium, such as memory/storage 210. The software instructions may be read into memory/storage 210 from another computer-readable medium or from another device via communication interface 220. The software instructions contained in memory/storage 210 may cause processing system 205 to perform processes described herein. Alternatively, hardwired circuitry may be used in place of or in combination with software instructions to implement processes described herein. Thus, implementations described herein are not limited to any specific combination of hardware circuitry and software.

Figure 3C:
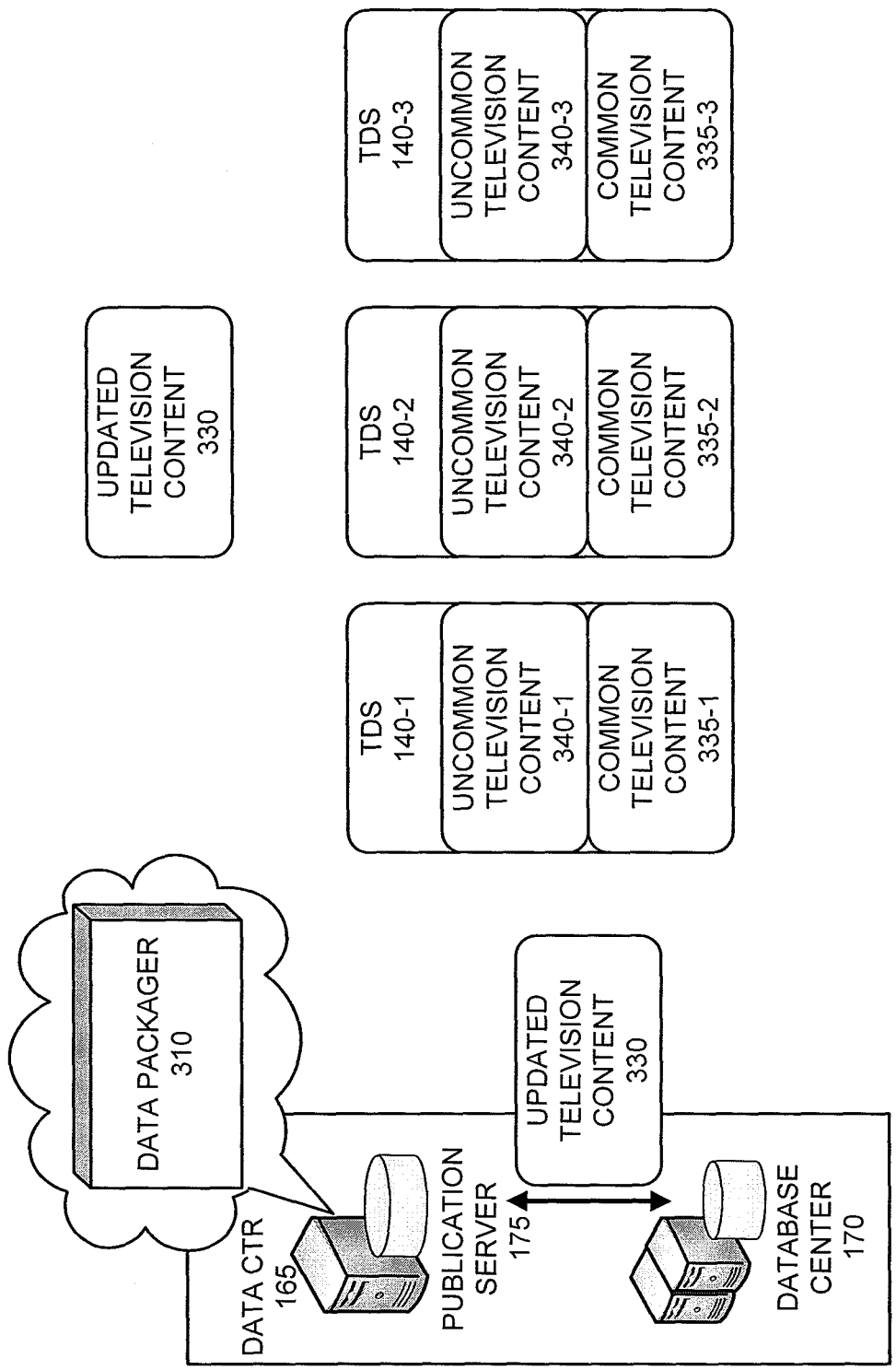

FIGS. 3A-3E are diagrams illustrating exemplary functional components of publication server 175. In other embodiments, one or more of the functions associated with publication server 175 may be implemented wholly, or partially, in another device, for example, associated with data center 165. For example, one or more functions associated with publication server 175 may be implemented wholly, or partially, in database center 170. As illustrated in FIG. 3A, publication server 175 may include a primary server selector (PSS) 305, a data packager 310, a replication file generator (RFG) 315, and a publishing scheduler 320. PSS 305, data packager 310, RFG 315, and publishing scheduler 320 may be implemented in hardware (e.g., processing system 205) or a combination of hardware and software (e.g., applications 215).

As previously described, publication server 175 may select a primary television content distribution device (e.g., search server 155) to perform replication of the updated television content. In one implementation, publication server 175 may select the primary search server 155 based on the search server 155 having the least load of search servers 155. Publication server 175 may package the updated television content and publish or push the packaged updated television content to each of the TDSs 140 based on size of the updated television content and/or time zone considerations. Publication server 175 may publish a replication file that provides information for replicating the updated television content to the other search servers 155. Described below are the functional components that provide these processes and/or operations.

Referring to FIG. 3A, PSS 305 may identify which of search servers 155 will be selected or designated as primary search server 155. Primary search server 155 may be responsible for replicating the updated television content to the other search servers 155. PSS 305 may select primary search server 155 based on load information. For example, FIG. 3B is a diagram illustrating an exemplary selection process of primary search server 155. As illustrated, publication server 175 may communicate with each of search servers 155-1, 155-2, and 155-3. PSS 305 may obtain load information 325-1, 325-2, and 325-3 (referred to generally as load information 325) from each of search servers 155-1, 155-2, and 155-3. Load information 325 may indicate a load capacity (e.g., customer requests, bandwidth availability, resource usage, etc.) associated with search server 155. Based on load information 325, PSS 305 may determine which of search server 155-1, 155-2, and 155-3 has the least load at the time of the query. PSS 305 may then select or designate one of search servers 155-1, 155-2, or 155-3 as primary search server 155 based on this determination. PSS 305 may perform this process and/or operations for each TDS 140 to which it services.

Referring back to FIG. 3A, data packager 310 may package the updated television content for delivery or publication to primary search servers 155 associated with TDSs 140. For example, FIG. 3C is a diagram illustrating an exemplary data packaging process of the updated television content. As illustrated, data packager 310 may receive or retrieve updated television content 330 from database center 170. Data packager 310 may process updated television content 330 to determine the television content that may be common to each of TDSs 140. For example, as illustrated in FIG. 3C, data packager 310 may select common television content 335-1, 335-2, and 335-3 (generally referred to common television content 335), for TDSs 140-1, 140-2, and 140-3. Common television content 335 may include, for example, television guides, games, television content on-demand, and other types of television content. Thereafter, data packager 310 may process updated television content 330 to determine the television content that may be uncommon to each of TDSs 140. For example, as illustrated in FIG. 3C, data packager 310 may select uncommon television content 340-1, 340-2, and 340-3 (generally referred to as uncommon television content 340), for TDSs 140-1, 140-2, and 140-3.

Figure 3D:
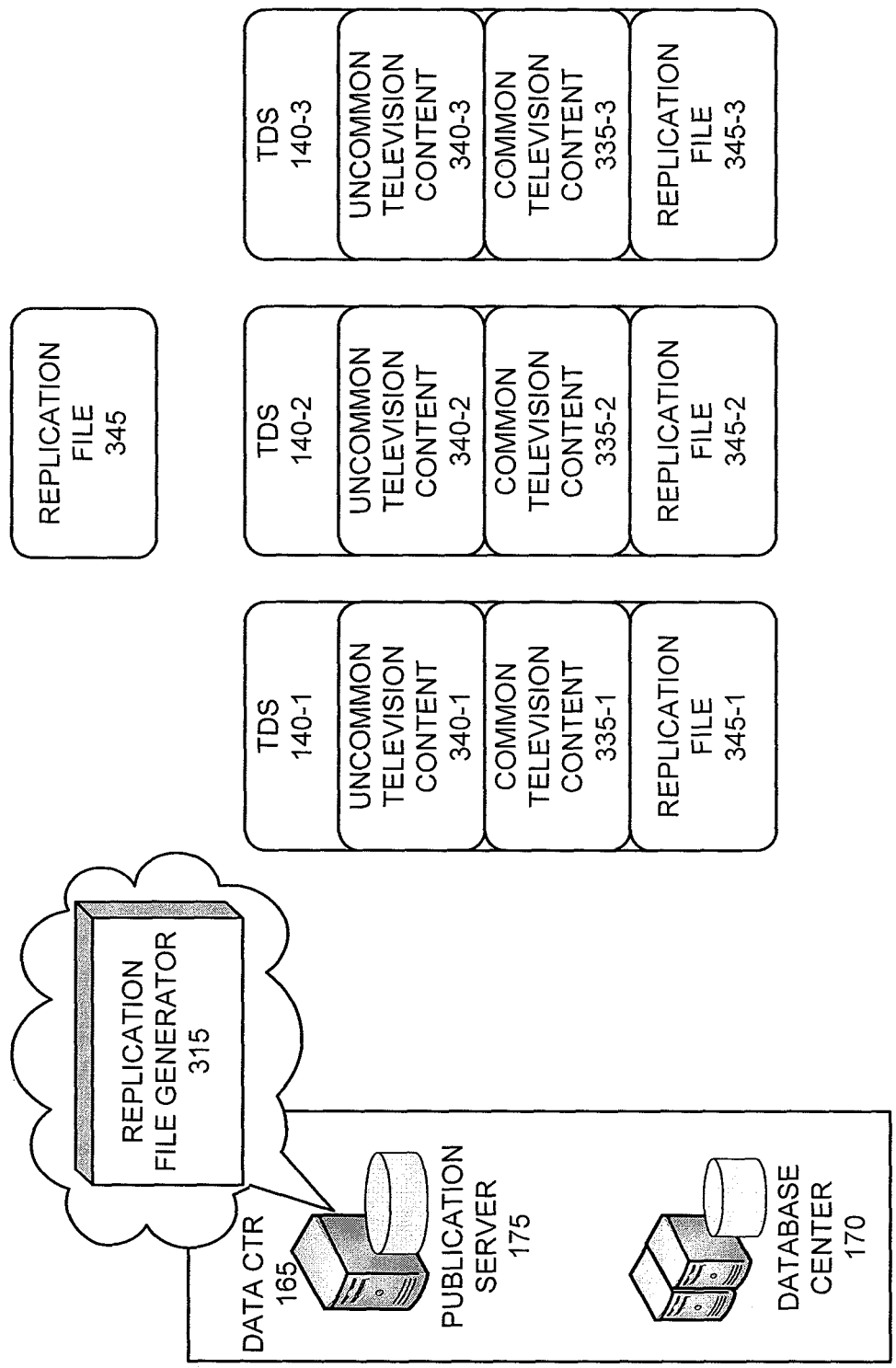

Referring back to FIG. 3A, RFG 315 may generate a replication file that instructs and/or indicates to search server 155 (e.g. primary search server 155) to replicate the packaged updated television content to another search server 155. For example, FIG. 3D is a diagram illustrating an exemplary process for generating a replication file 345. As illustrated, RFG 315 may generate replication file 345. Replication file 345 may correspond to, for example, a flag, a script, a program, and/or some other type of file or data that may instruct and/or indicate to replicate the packaged updated television content. For example, replication file 345 may instruct and/or indicate to primary search servers 155 to replicate the packaged updated television content with the other search servers 155. Replication file 345 may be included with the packaged updated television content associated with TDSs 140-1, 140-2, and 140-3. For example, data packager 310 may package common television content 335, uncommon television content 340, and replication 345-1, 345-2, and 345-3 (generally referred to replication file 345), for each of the TDSs 140.

Publishing scheduler 320 may provide for the scheduling and pushing or publishing of the packaged updated television content to the selected primary search servers 155. As previously described, the packaged updated television content may be pushed to each of the selected primary search servers 155 based on the sizes of the packaged updated television content and/or the time zones associated with the TDSs 140.

Figure 3E:
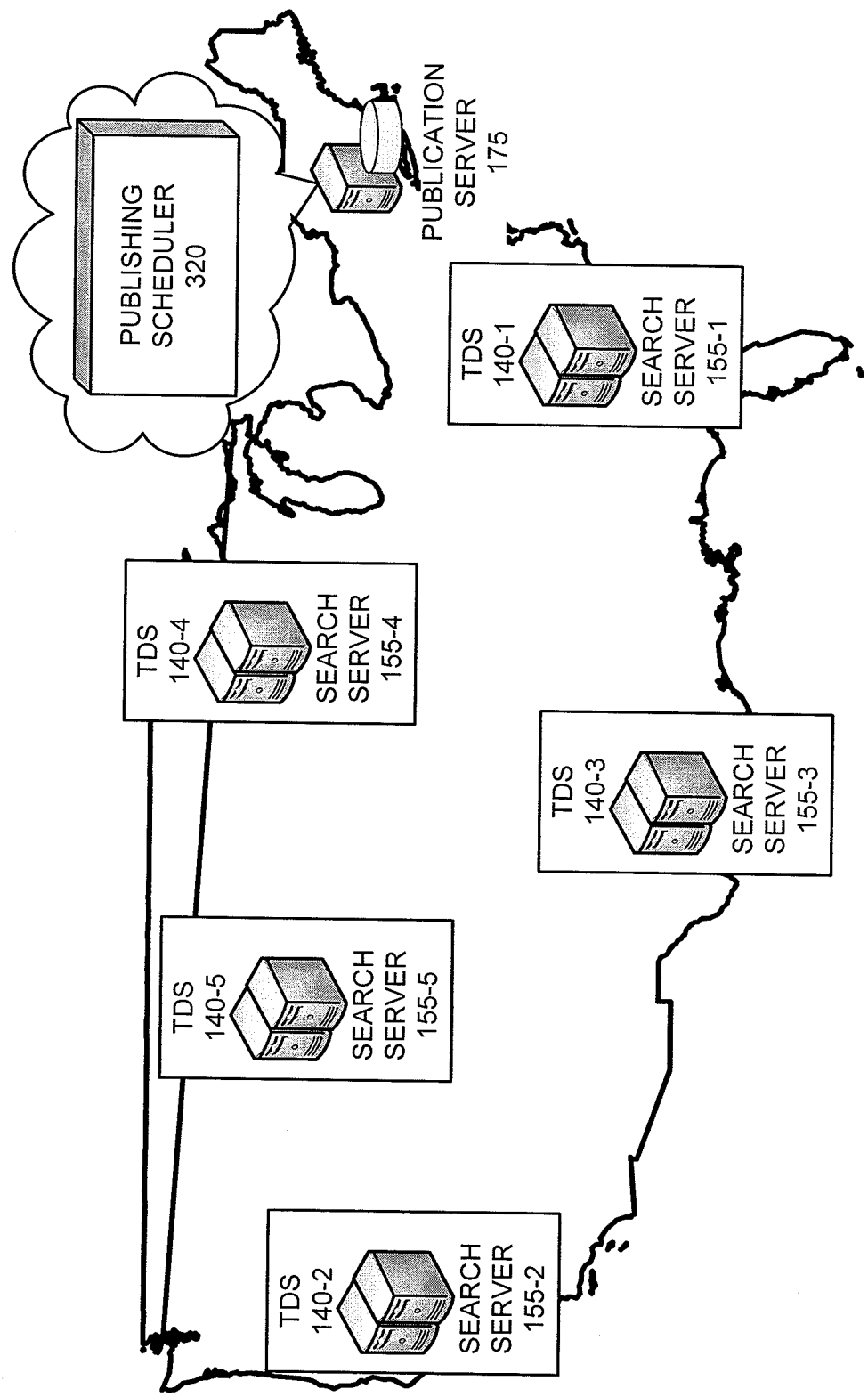

For example, FIG. 3E is a diagram illustrating an exemplary process for pushing or publishing the packaged updated television content. As illustrated, publication server 175 may need to push the packaged updated television content to various geographic locations. For example, TDSs 140-1 through 140-5 may be located in various places in the United States. Publishing scheduler 320 may identify the size of data associated with each of the packaged updated television content. In practice, the size of data may vary based on the size of the customer base and corresponding geographic area in which TDS 140 may serve. Publishing scheduler 320 may estimate the time it will take to push the packaged updated television content to primary search server 155 based on the identified size of the data, as well as other considerations, such as, for example, bandwidth availability, etc. Publishing scheduler 320 may identify the different time zones associated with each of TDSs 140. Based on one or more of these considerations, publishing scheduler 320 may push the packaged updated television content to each of primary search servers 155 (i.e., 155-1 through 155-5). Publishing scheduler 320 may push the packaged updated television content serially or in parallel among TDSs 140. Publishing scheduler 320 may begin pushing the packaged updated television content during the late evening or early morning hours to minimize disruption of service to customers.

Although FIGS. 3A-3E illustrate exemplary functional components of device 200, in other implementations, additional, fewer, or different functional components, and/or a different arrangement of functional components may be utilized other than those described and illustrated in FIGS. 3A-3E.

Figure 4:
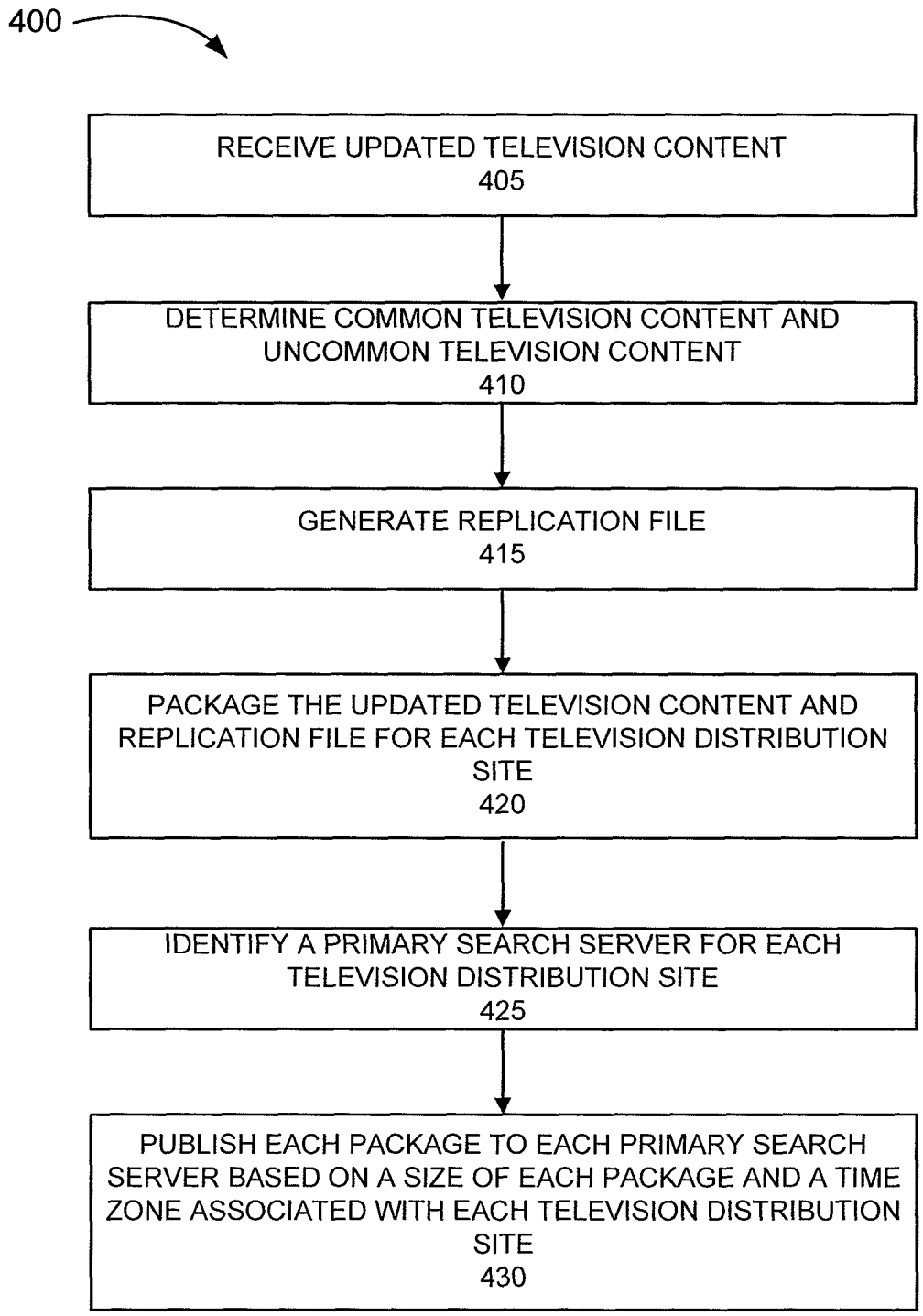
FIG. 4 is a flow diagram illustrating an exemplary process for publishing updated television content.

FIG. 4 is a flow diagram illustrating an exemplary process 400 for publishing updated television content.

Process 400 may begin with receiving updated television content (block 405). For example, data center 165 (e.g., database center 170) may receive updated television content 330. Publication server 175 (e.g., data packager 310) may receive or retrieve updated television content 330 from database center 170.

Common television content and uncommon television content may be determined (block 410). For example, data packager 310 may process updated television content 330 to determine the television content that may be common to each of TDSs 140. Common television content 335 may include, for example, television guides, games, television content on-demand, and other types of television content. Data packager 310 may process updated television content 330 to determine the television content that may be uncommon to each of TDSs 140. Uncommon television content 340 may include, for example, local television content, television schedules, and other types of television programming.

A replication file may be generated (block 415). For example, publication server 175 (e.g., RFG 315) may generate replication file 345. Replication file 345 may instruct and/or indicate to primary search servers 155 to replicate the packaged updated television content with the other search servers 155.

The updated television content and the replication file for each television distribution site may be packaged (block 420). For example, data packager 310 may package common television content 335, uncommon television content 340, and replication file 345 for each of the TDSs 140.

A primary search server for each television distribution site may be identified (block 425). For example, publication server 175 (e.g., PSS 305) may identify which of search servers 155 will be selected or designated as primary search server 155. PSS 305 may select primary search server 155 based on load information. PSS 305 may obtain load information 325 from each of search servers 155. Load information 325 may indicate a load capacity (e.g., customer requests, bandwidth availability, resource usage, etc.) associated with search server 155. Based on load information 325, PSS 305 may determine which of search servers 155 in a particular TDS 140 has the least load at the time of the query. PSS 305 may then select or designate one of search servers 155 as primary search server 155 based on this determination. PSS 305 may perform this process and/or operations for each TDS 140 that it services.

Each package may be published to each primary search server based on a size of each package and a time zone associated with each television distribution site (block 430). Publication server 175 (e.g., publishing scheduler 320) may provide for the scheduling and pushing or publishing of the packaged updated television content to the selected primary search servers 155. The packaged updated television content may be pushed to each of the selected primary search servers 155 based on the sizes of the packaged updated television content and/or the time zones associated with the TDSs 140.

Publishing scheduler 320 may identify the size of data associated with each of the packaged updated television content. The size of data may vary based on the size of the customer base and corresponding geographic area in which TDS 140 may serve. Publishing scheduler 320 may estimate the time it will take to push the packaged updated television content to the primary search server 155 based on the identified size of the data, as well as other considerations, such as, for example, bandwidth availability, etc. Publishing scheduler 320 may identify the different time zones associated with each of TDSs 140. Based on one or more of these considerations, publishing scheduler 320 may push the packaged updated television content to each of the primary search servers 155. Publishing scheduler 320 may push the packaged updated television content serially or in parallel among TDSs 140.

Although FIG. 4 illustrates an exemplary process 400, in other implementations, additional, fewer, and/or different operations than those described, may be performed. Additionally, although a particular operation of process 400 is described as being performed by a device, such as publication server 175, in other implementations, a different device may perform the operation, or in combination therewith.

Figure 5A:
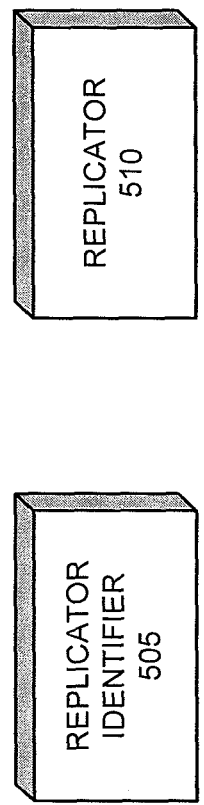
FIGS. 5A and 5B are diagrams illustrating exemplary functional components of a search server depicted in FIGS. 1 and 2.
Figure 5B:
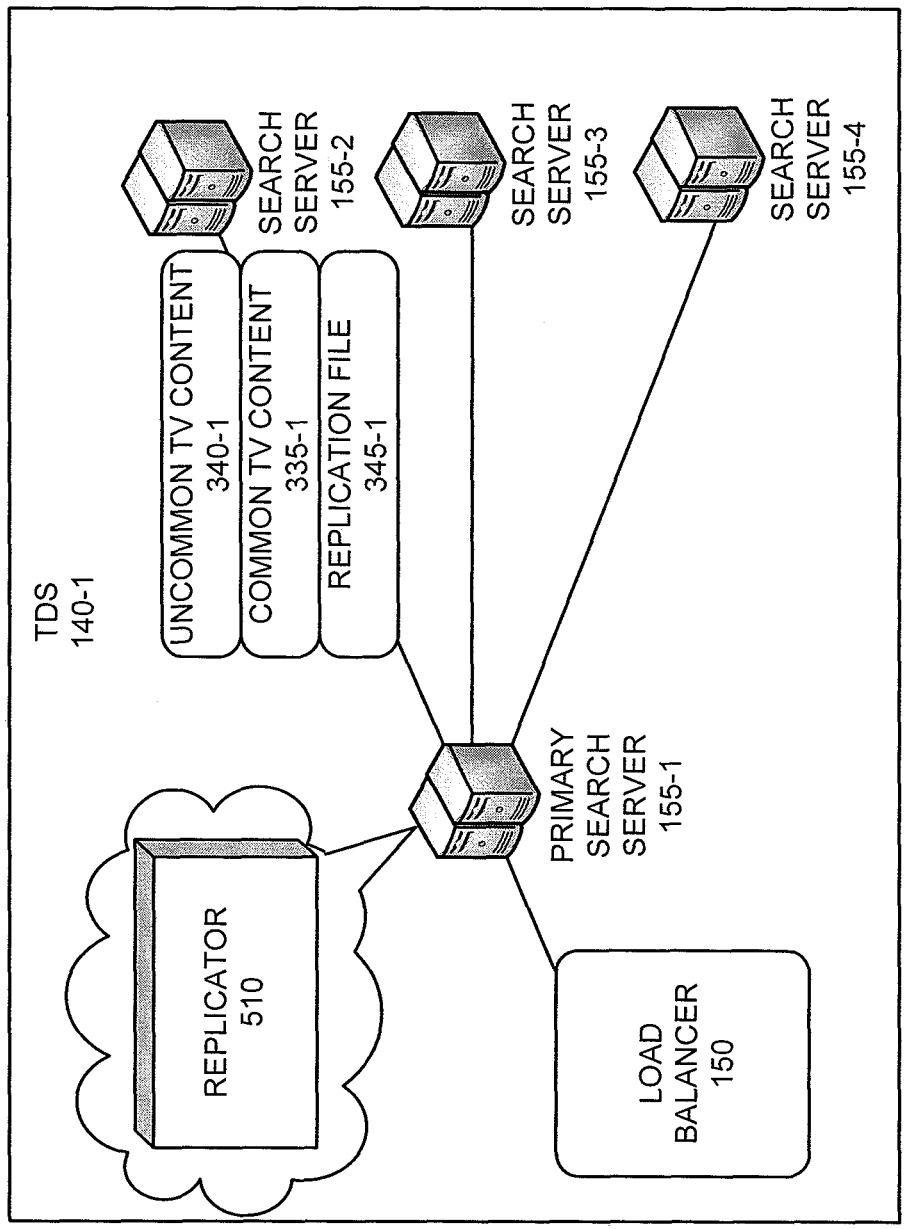

FIGS. 5A and 5B are diagrams illustrating exemplary functional components of search server 155. In other embodiments, one or more of the functions associated with search server 155 may be implemented wholly, or partially, in another device associated with TDS 140. For example, one or more functions associated with search server 155 may be implemented wholly, or partially, in database cluster 160. As illustrated in FIG. 5A, search server 155 may include a replicator identifier 505 and a replicator 510. Replicator identifier 505 and replicator 510 may be implemented in hardware (e.g., processing system 205) or a combination of hardware and software (e.g., applications 215).

As previously described, primary search server 155 may replicate the pushed packaged television content to another search server 155 based on replication file 345. Described below are the functional components that provide these processes and/or operations.

Replicator identifier 505 may identify the existence of replication file 345. For example, each of search servers 155 may search for replication file 345 in memory/storage 210. In one embodiment, the search for replication file 345 may be based on a time-based schedule (e.g. a time-based trigger). In another embodiment, the search for replication file 345 may be based on some other parameter (e.g., a load condition). When replication file 345 is discovered, search server 155 may recognize that it is designated as primary search server 155 and may replicate the packaged updated television content to another search server 155.

Replicator 510 may manage the replication of the packaged updated television content to another search server 155 and the loading of the packaged updated television content. Replicator 510 may select a time to push the packaged television content to another search server 155 based on or more parameters, such as, for example, load conditions associated with other search server 155 and/or a time-based schedule. For example, FIG. 5B is a diagram illustrating an exemplary replication process. As illustrated, replicator 510 may push the packaged updated television content (e.g., common television content 335-1, uncommon television content 340-1, replication file 345-1) to one of search servers 155-2, 155-3, and 155-4 (e.g., search server 155-2). Replicator 510 may also coordinate the loading of the packaged updated television content onto primary search server 155. For example, replicator 510 may not accept customer traffic during the loading of packaged updated television content. In one implementation, replicator 510 may communicate with load balancer 150. Once the loading of packaged updated television content is completed, replicator 510 may communicate with load balancer 150 to accept customer traffic. In this way, only one search server 155 at a time may be unavailable during the updating process.

Although FIGS. 5A and 5B illustrate exemplary functional components, in other implementations, additional, fewer, or different functional components, and/or a different arrangement of functional components may utilized than those described and illustrated in FIGS. 5A and 5B.

Figure 6:
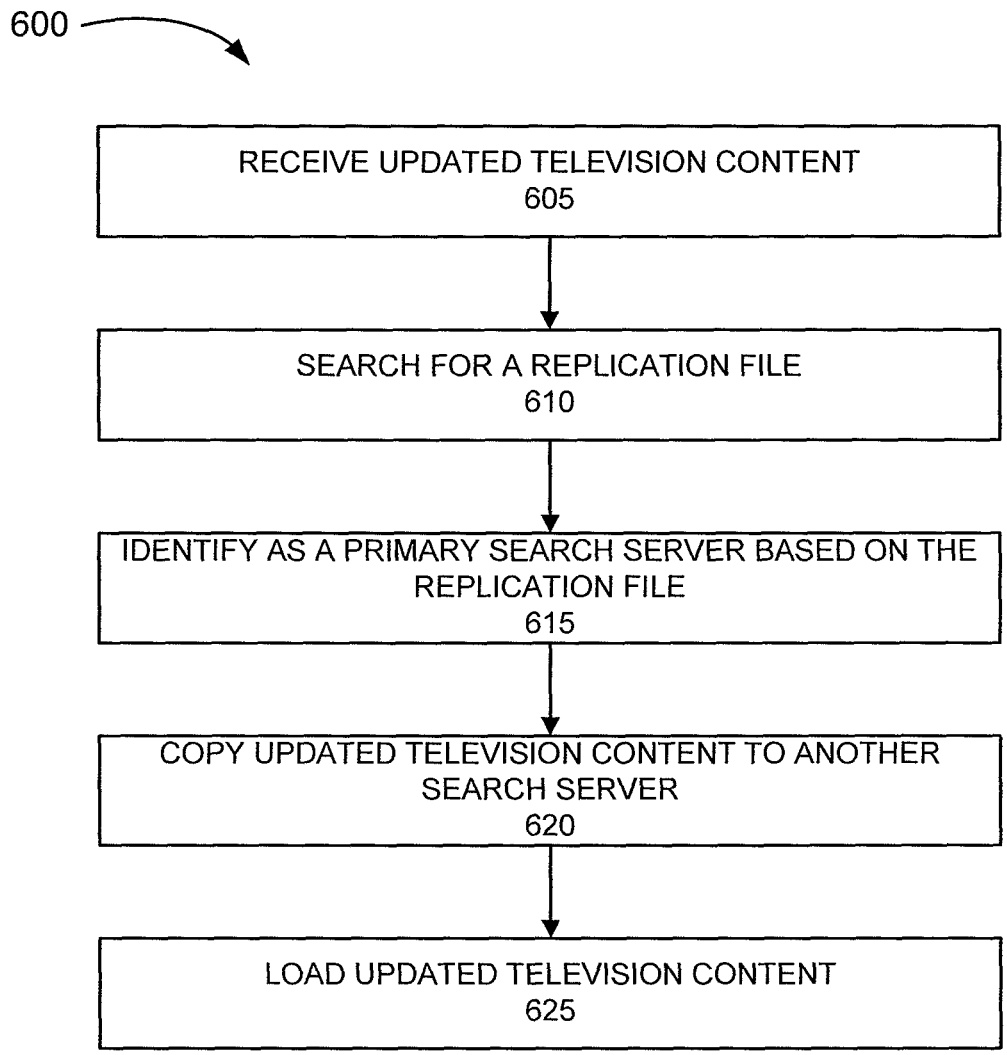
FIG. 6 is a flow diagram illustrating an exemplary process for replicating updated television content.

FIG. 6 is a flow diagram illustrating an exemplary process 600 for replicating updated television content.

Process 600 may begin with receiving updated television content (block 605). For example, TDS 140 (e.g., search server 155) may receive updated television content from data center 165 (e.g., publication server 175). The packaged updated television content may include common television content 335, uncommon television content 340, and replication file 345.

A search for a replication file may be performed (block 610). For example, search server 155 (e.g., replicator identifier 505) may search for replication file 345 in memory/storage 210. In one embodiment, the search for replication file 345 may be based on a time-based schedule (e.g. a time-based trigger) or some other parameter (e.g., load condition).

A primary search server may be identified based on the replication file (block 615). For example, replicator identifier 505 may recognize that it is designated as primary search server 155 when it finds replication file 345.

The updated television content may be provided to another search server (block 620). For example, primary search server (e.g., replicator 510) may select a time to push the packaged television content to another search server 155 based on or more parameters, such as, for example, load conditions associated with other search server 155 and/or a time-based schedule. The packaged updated television content may include common television content 335, uncommon television content 340, and replication file 345.

The updated television content may be loaded (block 625). For example, replicator 510 may load the packaged updated television content on primary search server 155.

Although FIG. 6 illustrates an exemplary process 600, in other implementations, additional, fewer, and/or different operations than those described, may be performed. Additionally, although a particular operation of process 600 is described as being performed by a device, such as search server 155, in other implementations, a different device may perform the operation, or in combination therewith.

As previously described, the process of receiving, processing, and publishing the updated television content may include monitoring and verification processes. Additionally, automatic retry mechanisms may be implemented to minimize human intervention, as well as automatic notification procedures (e.g., to network operator personnel) to provide human intervention when it may be needed.

Figure 7A:
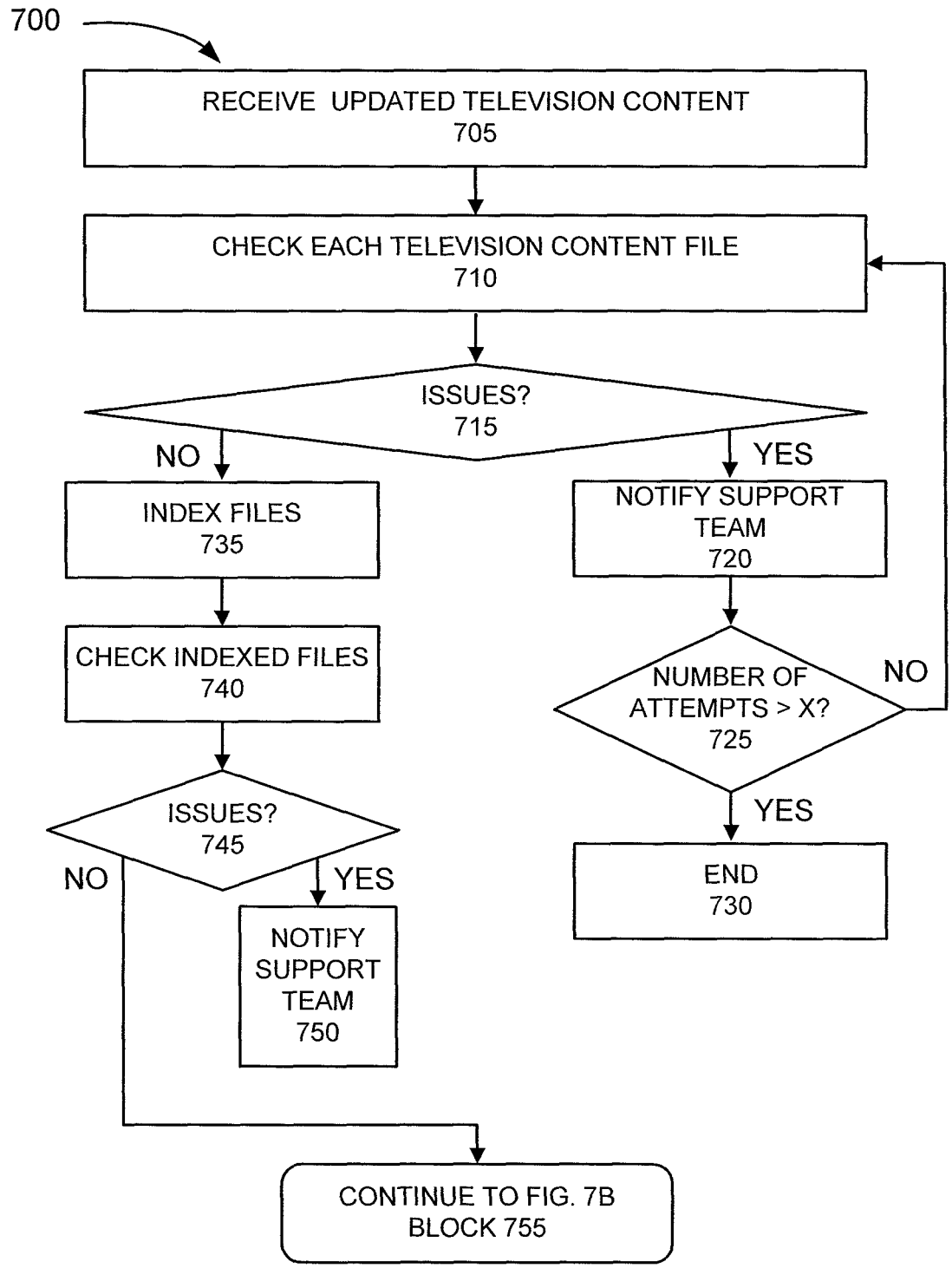
FIGS. 7A and 7B are flow diagrams illustrating an exemplary process that provides monitoring, verifying, retrying, and notifying mechanisms during publication of updated television content.
Figure 7B:
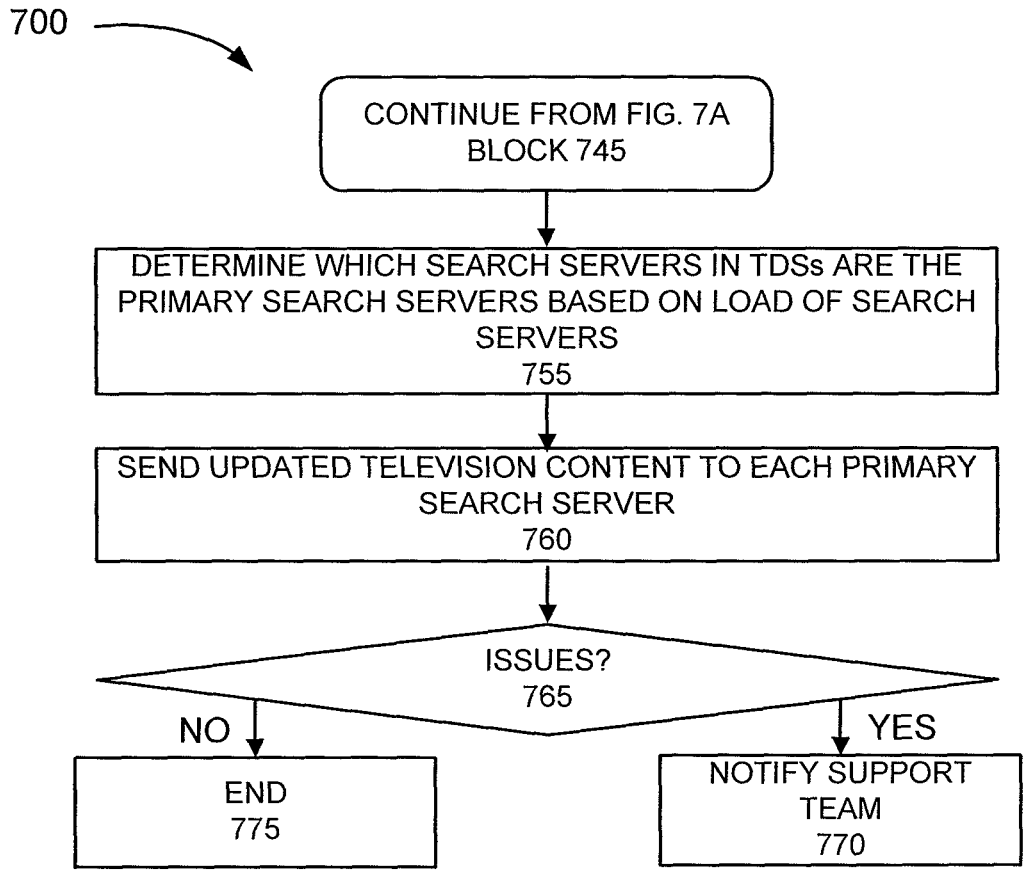

FIGS. 7A and 7B are flow diagrams illustrating an exemplary process 700 that provides monitoring, verifying, retrying, and notifying mechanisms during the publication of the updated television content. The television distribution devices described with respect to process 700, such as database center 170 and publication server 175, may perform the operations and processes relating to monitoring, verifying, retrying, and notifying, based on applications 215 or some other logic (e.g., processing system 205).

Referring to FIG. 7A, process 700 may begin with receiving updated television content (block 705). For example, data center 165 (e.g., database center 170) may receive updated television content from various resources (e.g., television program providers, etc.).

Each television content file may be checked (block 710). For example, database center 170 may check various aspects associated with each received updated television content file. For example, database center 170 may check for missing files, corrupted files, format issues, file size issues, and various other issues related to data integrity, data verification, etc.

When it is determined that an issue exists (block 715—YES), then database center 170 may automatically generate and send an e-mail notification to network operation support personnel (block 720). The e-mail may provide information to indicate the issue at hand.

The number of retry attempts may be determined (block 725). Database center 170 may include a counter mechanism to tally the number of retries to diagnose and/or carry out the procedures in block 710. When it is determined that the number of retries is below a threshold value (block 725—NO), then database center 170 may return to block 710 and continue this loop until the number of retries exceed the threshold value. In one embodiment, the e-mail notifications during subsequent retries may be submitted to the same, additional, or different network operation support personnel. Additionally, the e-mails may include indications of different levels of alert. When it is determined that the number of retries is above the threshold value (block 725—YES), then database center 170 may halt process 700 (block 730). Database center 170 may generate and send a final e-mail notification to network operation support personnel.

Returning to block 715, when it is determined that an issue does not exist (block 715—NO), the updated television content may be indexed (block 735). For example, publication server 175 may receive or retrieve the updated television content and process the updated television content. Publication server 175 may process the updated television content to determine the television content that may be common to each of TDSs 140 and the television content that may be uncommon to each of TDSs 140. Publication server 175 may generate replication file 345. Publication server 175 may compress common television content 335, uncommon television content 340, and replication file 345 into packages to be pushed to each of TDSs 140.

The indexed updated television content may be checked (block 740). Publication server 175 may verify readability, size of package, etc., with respect to each package. For example, publication server 175 may compare the size of each package with a size of a corresponding package of a previous day. Publication server 175 may determine whether a difference in size, based on the comparison, is considered significant (e.g., based on a threshold value (e.g., more than 10%)).

When it is determined that an issue exists with the indexed updated television content (block 745—YES), then publication server 175 may automatically generate and send an e-mail notification to network operation support personnel (block 750). The e-mail may provide information to indicate the issue at hand. Although not illustrated, an analogous loop as previously described with respect to blocks 710, 715, 720, 725, and 730, may be implemented. In other words, publication server 175 may automatically attempt one or more retries with respect to blocks 735 and/or 740, in conjunction with automatically generating and sending e-mail notifications, until the number of retries exceed a threshold value.

When it is determined that an issue does not exist with the indexed updated television content (block 745—NO), publication server 175 may determine which search servers 155 in TDSs 140 are primary search servers 155 based on load of search servers 155 (block 755) (as illustrated in FIG. 7B). Publication server 175 may send the packaged updated television content to each primary search server 155 (block 760). Similarly, when it is determined that an issue exists with respect to determining primary search servers 155 and/or sending the updated television content (block 765—YES), publication server 175 may automatically attempt one or more retries with respect to blocks 755 and/or 760, in conjunction with automatically generating and sending e-mail notifications, until the number of retries exceed a threshold value (block 770). When it is determined that an issue does not exist with respect to determining primary search servers 155 and/or sending the updated television content (block 765—NO), process 700 may end (block 775).

Although FIGS. 7A and 7B illustrate an exemplary process 700, in other implementations, additional, fewer, and/or different operations than those described, may be performed. Additionally, although a particular operation of process 700 is described as being performed by a device, such as database center 170 or publication server 175, in other implementations, a different device may perform the operation, or in combination therewith.

As previously described, the process of receiving, processing, and replicating the updated television content may include monitoring, verifying, retrying, and notifying mechanisms analogous to those utilized during the publication process.

FIGS. 8A-8D are flow diagrams illustrating an exemplary process 800 that provides monitoring, verifying, retrying, and notifying mechanisms during the replication of the updated television content. The television distribution devices described with respect to process 800, such as search servers 155, may perform the operations and processes relating to monitoring, verifying, retrying, and notifying, based on applications 215 or some other logic (e.g., processing system 205).

Figure 8A:
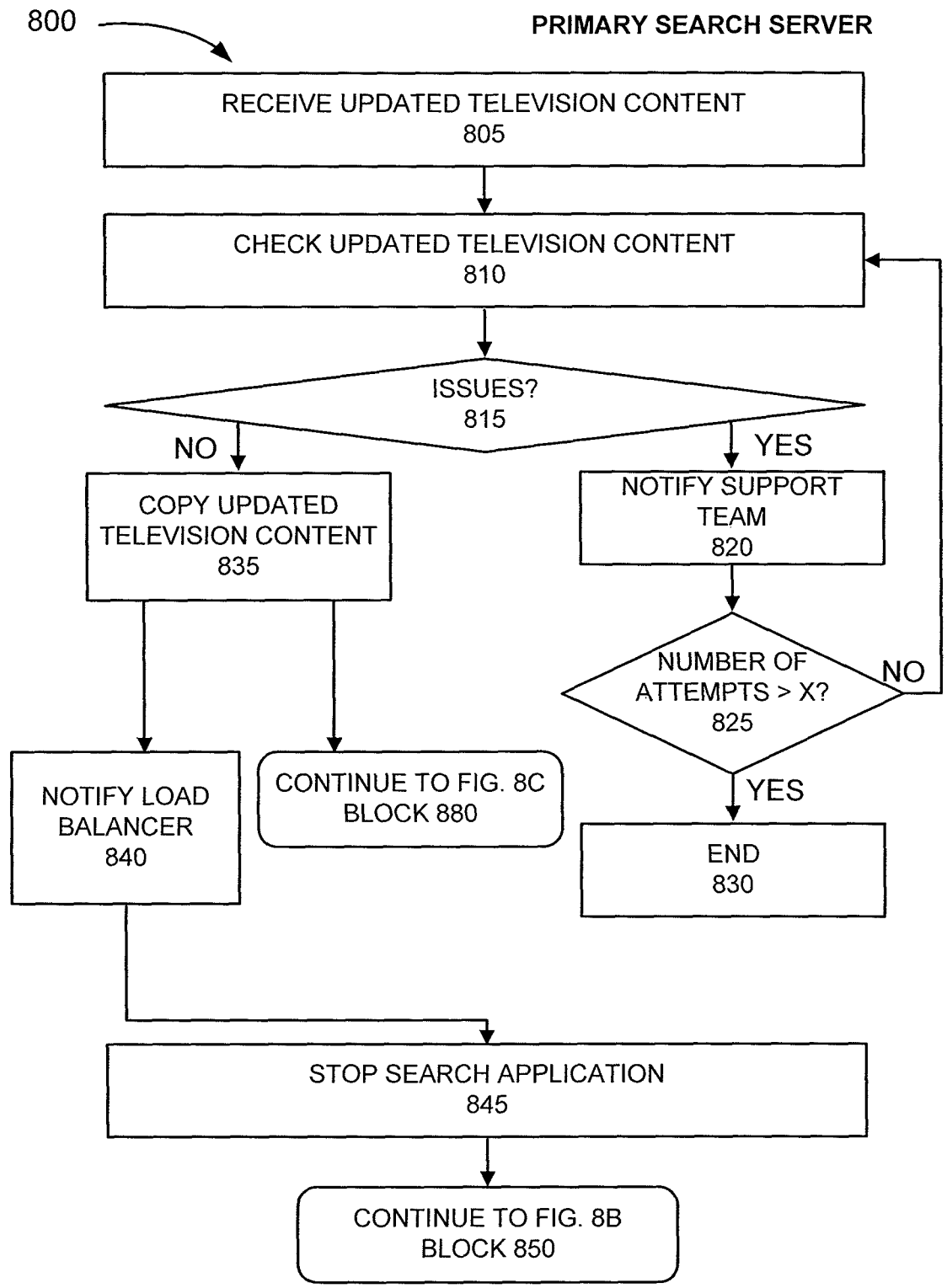
FIGS. 8A-8D are flow diagrams illustrating an exemplary process that provides monitoring, verifying, retrying, and notifying mechanisms during replication of updated television content.

Referring to FIG. 8A, process 800 may begin with receiving updated television content (block 805). For example, TDS 140 (e.g., primary search server 155) may receive the packaged updated television content from data center 165 (e.g., publication server 175).

The updated television content may be checked (block 810). For example, primary search server 155 may check various aspects associated with the packaged updated television content. For example, primary search server 155 may check for missing files, corrupted files, format issues, file size issues, and various other issues related to data integrity, data verification, etc.

When it is determined that an issue exists (block 815—YES), then primary search server 155 may automatically generate and send an e-mail notification to network operation support personnel (block 820). The e-mail may provide information to indicate the issue at hand.

The number of retry attempts may be determined (block 825). Primary search server 155 may include a counter mechanism to tally the number of retries to diagnose and/or carry out the procedures in block 810. When it is determined that the number of retries is below a threshold value (block 825—NO), then primary search server 155 may return to block 810 and continue this loop until the number of retries exceed the threshold value. In one embodiment, the e-mail notifications during subsequent retries may be submitted to the same, additional, or different network operation support personnel. Additionally, the e-mails may include indications of different levels of alert. When it is determined that the number of retries is above the threshold value (block 825—YES), then primary search server 155 may halt process 800 (block 830). Primary search server 155 may generate and send a final e-mail notification to network operation support personnel.

Returning to block 815, when it is determined that an issue does not exist (block 815—NO), the updated television content may be copied (block 835). For example, primary search server 155 may copy the updated television content to appropriate directories. Primary search server 155 (e.g., replicator 510) may also copy the packaged updated television content to another search server 155.

The load balancer may be notified (block 840). Primary search server 155 may notify load balancer 150 that primary search server 155 is prepared to update various directories and will not be able to accept customer traffic during this time.

A search application may be stopped (block 845). Primary search server 155 may stop various applications 215 that provide television content services. For example, a search application that permits customers to search television content may be halted.

Figure 8B:
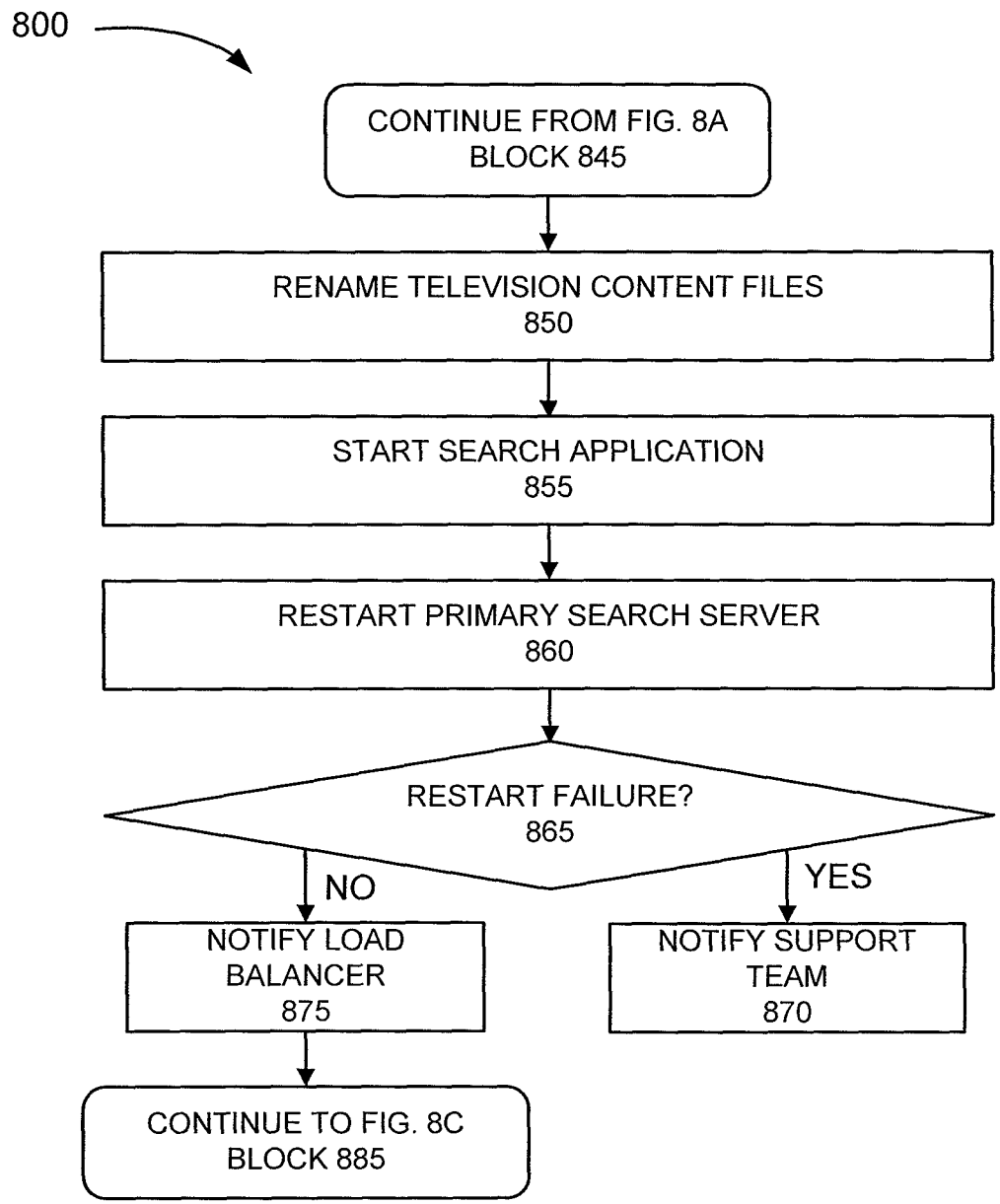

Referring to FIG. 8B, television content files may be renamed (block 850). For example, primary search server 155 may perform various update processes in accordance with the updated television content. For example, primary search server 155 may rename files.

The search application may be restarted (block 855). Primary search server 155 may restart various applications that provide television content services. For example, the search application that permits customers to search television content may be restarted.

The primary search server may be restarted (block 860). Primary search server 155 may automatically restart. Primary search server 155 may perform various warm-up tests.

When it is determined that a restart failure exists (block 865—YES), primary search server 155 may automatically generate and send an e-mail to network operation support personnel (block 870). The e-mail may provide information to indicate the issue at hand. Primary search server 155 may automatically roll back to a previous file, to avoid the utilization of the updated television content file that may have triggered the restart failure, when a failure occurs.

When it is determined that a restart failure does not exist (block 865—NO), primary search server 155 may notify the load balancer (block 875). For example, primary search server 155 may notify load balancer 150 that primary search server 155 has completed the update and will be able to accept customer traffic.

Figure 8C:
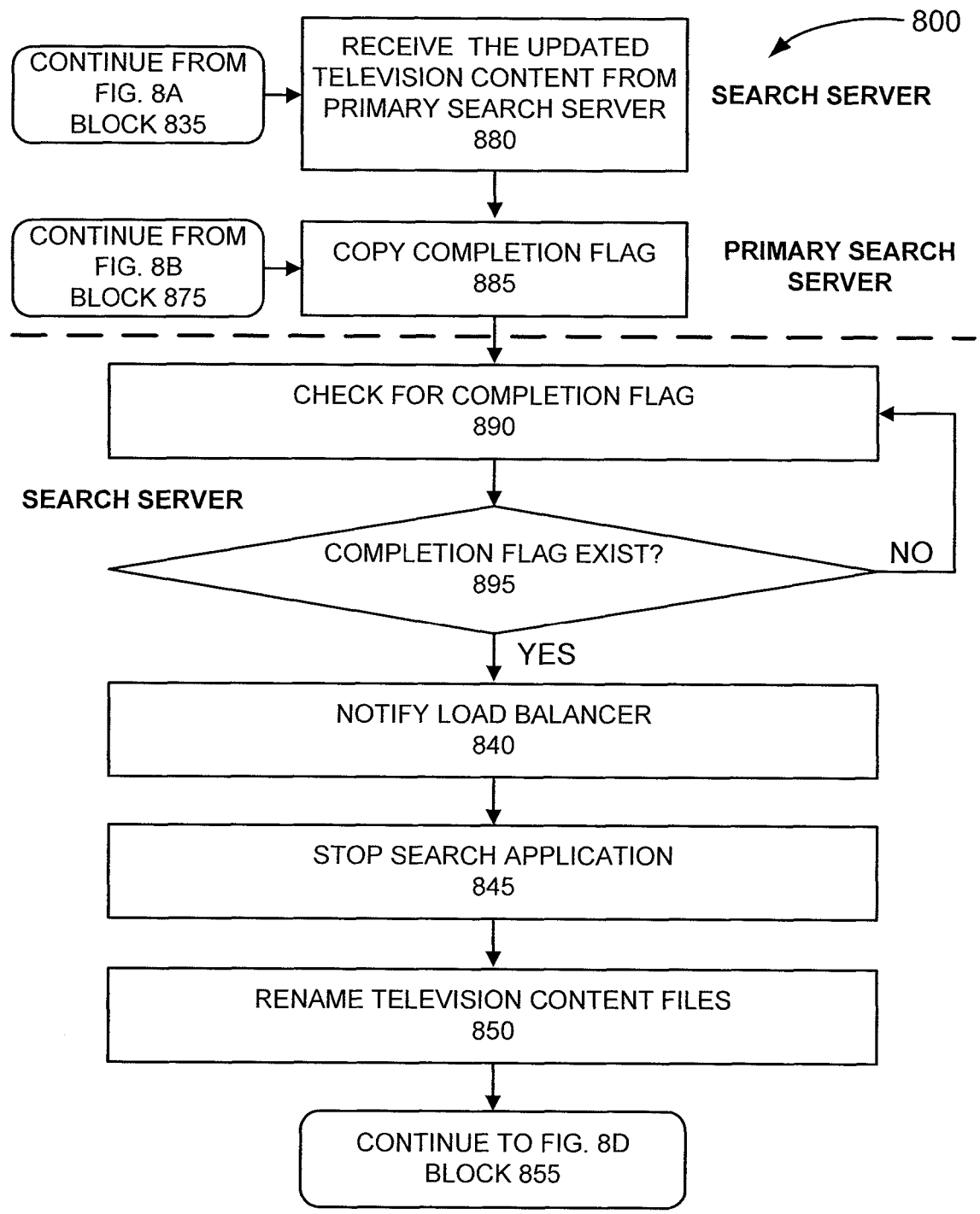

Referring to FIG. 8C, as previously described in FIG. 8A, block 835, primary search server 155 may copy the updated television content to another search server 155. From the perspective of other search server 155, the updated television content may be received from primary search server 155 (block 880).

Primary search server 155 may then continue the update process described in blocks 840-880. After primary search server 155 notifies load balancer 150 that it may accept customer traffic, primary search server may copy a completion flag to other search server 155 (block 885).

The completion flag may be checked (block 890). For example, other search server 155 may check (e.g. periodically or some other user-configured back-off time) for a completion flag or some other indication from primary search server 155 that the update process is completed by primary search server 155. When it is determined that the completion flag does not exist (block 895—NO) other search server 155 may continue to check for the completion flag (block 890). When it is determined that the completion flag does exist (block 895—YES), other search server 155 may perform the same operations primary search server 155 performed in blocks 840 through 875, as illustrated in FIG. 8C and FIG. 8D.

Figure 8D:
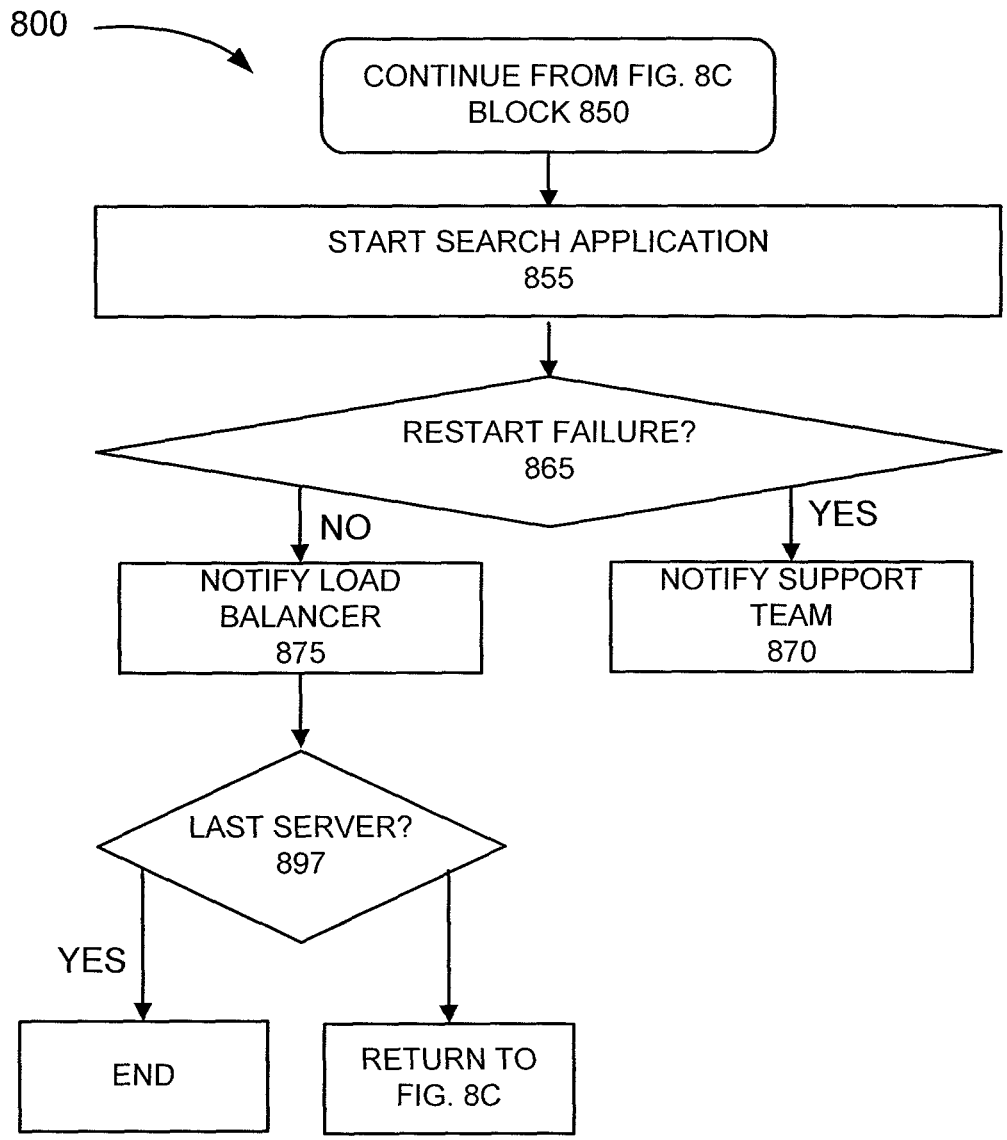

Referring to block 875 in FIG. 8D, other search server 155 may notify load balancer 150 that it has completed the update process. Other search server 155 may determine whether it is the last search server 155 to be updated in block 897. When it is determined that it is the last search server 155 to be updated (i.e., no other search servers 155 in TDS 140 need to be updated) (block 897—YES), the process 800 may be completed. When it is determined that is not the last search server 155 to be updated (i.e., there are other search servers 155 in TDS 140 that still need to be updated) (block 897—NO), then other search server 155 may copy the updated television content and a completion flag to another search server 155. Process 800 may continue, as previously described in FIG. 8C. Process 800 may continue to iterate these processes until all of search servers 155 in TDS 140 have been updated with the updated television content.

Although FIGS. 8A-8D illustrate an exemplary process 800, in other implementations, additional, fewer, and/or different operations than those described, may be performed. Additionally, although a particular operation of process 800 is described as being performed by a device, such search server 155, in other implementations, a different device may perform the operation, or in combination therewith.

The foregoing description of implementations provides illustration, but is not intended to be exhaustive or to limit the implementations to the precise form disclosed. Accordingly, modifications to the embodiments, implementations, etc., described herein may be possible.

The term "may" is used throughout this application and is intended to be interpreted, for example, as "having the potential to," "configured to," or "being able to," and not in a mandatory sense (e.g., as "must"). The terms "a," "an," and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

In addition, while series of blocks have been described with regard to the processes illustrated in FIGS. 4, 6, 7A, 7B, and 8A-8D, the order of the blocks may be modified in other implementations. Further, non-dependent blocks may be performed in parallel.

It will be apparent that the device(s) described herein may be implemented in many different forms of software or firmware in combination with hardware in the implementations illustrated in the figures. The actual software code (executable by hardware) or specialized control hardware used to implement these concepts does not limit the disclosure of the invention. Thus, the operation and behavior of a device(s) was described without reference to the specific software code—it being understood that software and control hardware can be designed to implement the concepts based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the implementations described herein unless explicitly described as such.

What is claimed is:

1. A method comprising:
receiving, by a television distribution device, updated television content files via a network;
checking, by the television distribution device to identify one or more issues related to data integrity and data verification, the updated television content files one or more times until a first threshold value of the checking is exceeded or until a determination that no issues related to the data integrity and the data verification exist;
notifying, by the television distribution device after each of the one or more times, network operation support personnel of the identified one or more issues via alerts of successive levels corresponding to each of the one or more times;
determining, by the television distribution device, common content for delivery to every television distribution site of a plurality of television distribution sites and select content for delivery to respective television distribution sites of the plurality television distribution sites;
generating, by the television distribution device, an updated television content package including the common content for each television distribution site, the select content for the respective television distribution sites, and a file that provides an indication, to copy the updated television content packages, to a plurality of television distribution devices associated with the plurality of television distribution sites;
comparing, by the television distribution device, a size of the updated television content package to a size of a previously-sent corresponding television content package;

notifying the network operation support personnel when the size of the updated television content package differs from the size of the previously-sent corresponding television content package by more than a second threshold value;

identifying, by the television distribution device when the size of the updated television content package differs from the size of the previously-sent corresponding television content package by less than the second threshold value, one of the plurality of television distribution devices, associated with each of the plurality of television distribution sites, to receive the updated television content package;

providing, by the television distribution device, the updated television content package to each of the identified television distribution devices.

2. The method of claim 1, further comprising:

estimating, by the television distribution device, an amount of time to push the updated television content package to each of the identified television distribution devices based on bandwidth availability; and pushing, by the television distribution device, the updated television content package to each of the identified television distribution devices at a time of day selected based on the estimated amount of time.

3. The method of claim 1, wherein the identifying comprises:

determining, by the television distribution device, a load associated with each of the plurality of television distribution devices associated with one of the plurality of television distribution sites; and selecting, by the television distribution device, the one of the plurality of television distribution devices, to receive the updated television content package, based on the one of the plurality of television distribution devices having a lowest load.

4. The method of claim 1, wherein the providing comprises:

providing, by the television distribution device, the updated television content package to each of the identified television distribution devices, according to a schedule based on a data size of the updated television content package.

5. The method of claim 1, wherein the providing comprises:

providing, by the television distribution device, the updated television content package to the identified television distribution devices, according to a schedule based on a time zone associated with the identified television distribution devices.

6. The method of claim 1, further comprising:

automatically generating and sending, by the television distribution device, a notification to an operator when an issue arises that prevents the television distribution device from providing the updated television content package to the identified television distribution devices.

7. A device comprising:

one or more memories to store instructions; and
one or more processors to execute the instructions in the one or more memories to:

receive updated television content files via a network;

check, to identify one or more issues related to data integrity and data verification, the updated television content files one or more times until a first threshold value of checks is exceeded or until a determination that no issues related to the data integrity and the data verification exist;

notify, after each of the one or more times, network operation support personnel of the identified one or more issues via alerts of successive levels corresponding to each of the one or more times;

determine common content for delivery to every television distribution site of a plurality television distribution sites and select content for delivery to respective television distribution sites of the plurality of television distribution sites;

generate an updated television content package including the common content for each television distribution site, the select content for the respective television distribution sites, and a copy indicator that provides an indication to copy the updated television content packages, to a plurality of television distribution devices associated with the plurality of television distribution sites;

compare a size of the updated television content package to a size of a previously-sent corresponding television content package;

notify the network operation support personnel when the size of the updated television content package differs from the size of the previously-sent corresponding television content package by more than a second threshold value;

select, when the size of the updated television content package differs from the size of the previously-sent corresponding television content package by less than the second threshold value, from each of the plurality of the television distribution sites, one of the plurality of television distribution devices to receive the updated television content package, based on a load condition associated with each of the associated television distribution devices; and provide the updated television content package to the selected television distribution device associated with each of the plurality of the television distribution sites.

8. The device of claim 7, wherein the one or more processors execute the instructions to:

estimate an amount of time to push the updated television content package to each of the identified television distribution devices based on bandwidth availability; and push the updated television content package to each of the identified television distribution devices at a time of day selected based on the estimated amount of time.

9. The device of claim 7, wherein the one or more processors execute the instructions to:

select a time to provide the updated television content package to the selected television distribution devices based on time zone information associated with the plurality of the television distribution sites and a data size of the updated television content package.

10. The device of claim 7, wherein the plurality of the television distribution sites differ in geographical location and number of customers.

11. The device of claim 7, wherein the one or more processors execute the instructions to:

automatically generate and send a communication to a network operator when an issue arises that prevents the device from providing the updated television content package to the selected television distribution devices.

12. The device of claim 11, wherein the one or more processors execute the instructions to:
   automatically re-attempt to provide the updated television content package for a number of times before halting, when the issue arises, where each time the issue arises, the communication is sent.

13. A non-transitory storage medium storing executable instructions executable by at least one processing system, the instructions including instructions to:
   receive, by a television distribution device, updated television content files via a network;
   check, to identify one or more issues related to data integrity and data verification, the updated television content files one or more times until a first threshold value of checks is exceeded or until a determination that no issues related to the data integrity and the data verification exist;
   notify, after each of the one or more times, network operation support personnel of the identified one or more issues via alerts of successive levels corresponding to each of the one or more times;
   determine common content for delivery to every television distribution site of a plurality of television distribution sites and select content for delivery to respective television distribution sites of the plurality television distribution sites;
   generate an updated television content package including the common content for each television distribution site, the select content for the respective television distribution sites, and a file that provides an indication, to copy the updated television content packages, to a plurality of television distribution devices associated with the plurality of television distribution sites;
   compare a size of the updated television content package to a size of a previously-sent corresponding television content package;
   notify the network operation support personnel when the size of the updated television content package differs from the size of the previously-sent corresponding television content package by more than a second threshold value;
   identify, when the size of the updated television content package differs from the size of the previously-sent corresponding television content package by less than the second threshold value, one of the plurality of television distribution devices, associated with each of the plurality of television distribution sites, to receive the updated television content package; and
   provide the updated television content package to each of the identified television distribution devices.

14. The non-transitory storage medium of claim 13, the instructions further comprising instructions to:
   estimate an amount of time to push the updated television content package to each of the identified television distribution devices based on bandwidth availability; and
   push, based on the estimated amount of time, the updated television content package to each of the identified television distribution devices at a time of day selected.

15. The non-transitory storage medium of claim 13, the instructions further comprising instructions to:
   determine a load associated with each of the plurality of television distribution devices associated with one of the plurality of television distribution sites; and
   select the one of the plurality of television distribution devices, to receive the updated television content package, based on the one of the plurality of television distribution devices having a lowest load.

16. The non-transitory storage medium of claim 13, the instructions further comprising instructions to:
   provide the updated television content package to each of the identified television distribution devices, according to a schedule based on a data size of the updated television content package.

17. The non-transitory storage medium of claim 13, the instructions further comprising instructions to:
   provide the updated television content package to the identified television distribution devices according to a schedule based on a time zone associated with the identified television distribution devices.

18. The non-transitory storage medium of claim 13, the instructions further comprising instructions to:
   automatically generate and send a notification to an operator when an issue arises that prevents the television distribution device from providing the updated television content package to the identified television distribution devices.

19. The non-transitory storage medium of claim 13, the instructions further comprising instructions to:
   check, to identify the one or more issues related to data integrity and data verification, the updated television content files to identify missing files, corrupted files, format issues, and file size issues.

20. The non-transitory storage medium of claim 13, wherein to notify the network operation support personnel, the instructions further comprising instructions to:
   notify a different one of the network operation support personnel with each of the alerts at each successive level.

* * * * *